March 11, 1958

E. S. CRUZ 2,826,381

LANDING GEAR FOR AIRCRAFT

Filed March 26, 1954

INVENTOR.
EDWARD S. CRUZ
BY
Agent

March 11, 1958   E. S. CRUZ   2,826,381
LANDING GEAR FOR AIRCRAFT
Filed March 26, 1954   3 Sheets-Sheet 2
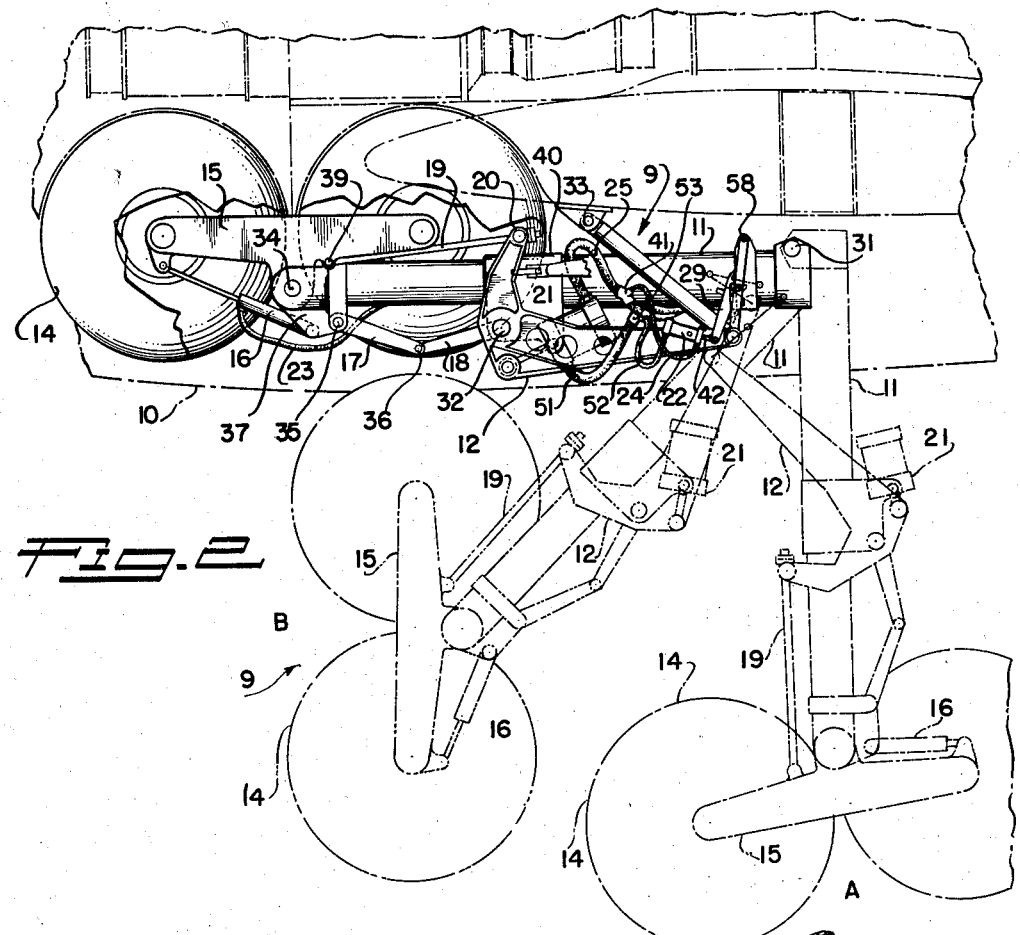
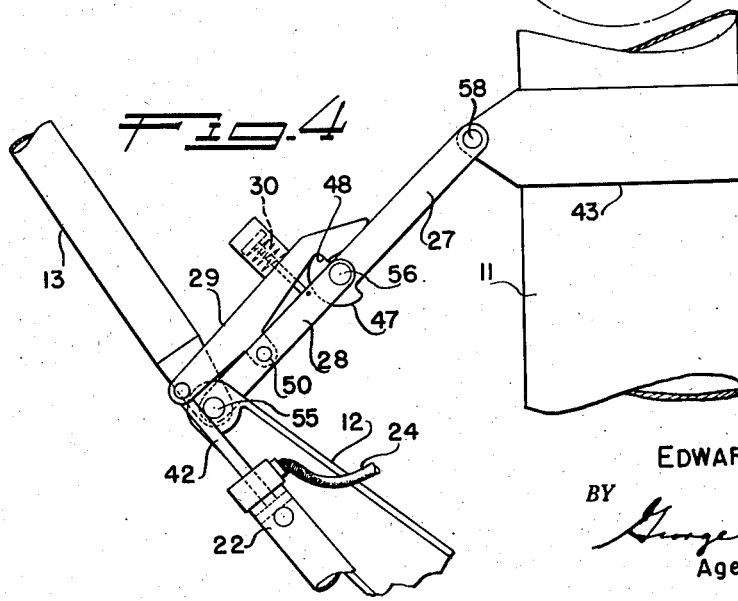
INVENTOR.
EDWARD S. CRUZ
BY
Agent

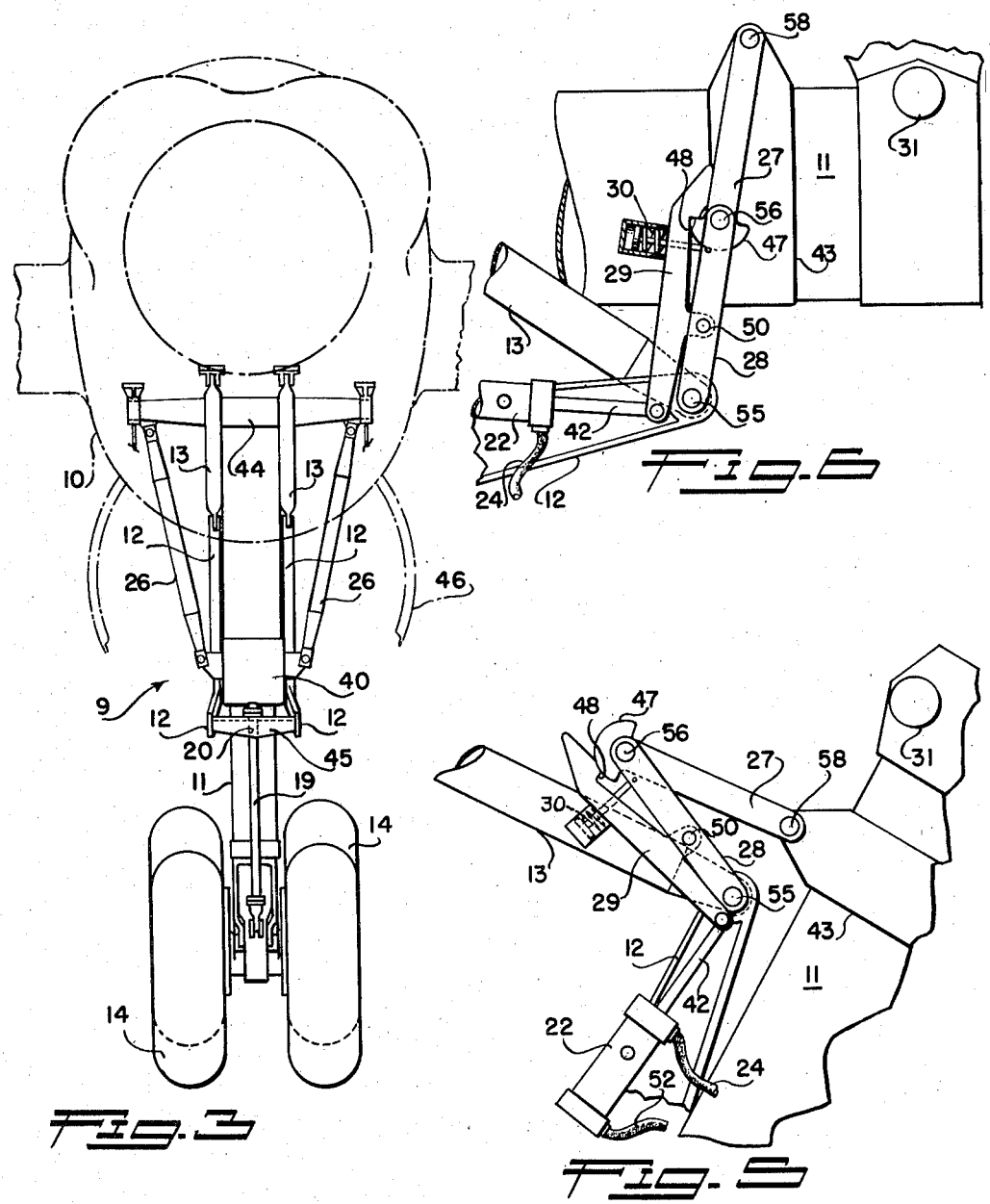

United States Patent Office 2,826,381
Patented Mar. 11, 1958

2,826,381

LANDING GEAR FOR AIRCRAFT

Edward S. Cruz, Van Nuys, Calif., assignor to Lockheed Aircraft Corporation, Burbank, Calif.

Application March 26, 1954, Serial No. 418,998

2 Claims. (Cl. 244—102)

This invention relates to aircraft landing gear of the retractable or folding type.

High speed aircraft with thin wing construction limits the amount of space available in the wings for the installation of aircraft components or equipment, particularly landing gear.

It is generally the practice of aircraft designers in this country to mount the aircraft powerplants in pods; as they apply to jet engines, or in nacelles as is the common term for reciprocating engine housings. The pods or nacelles, whatever the case, usually extend outward externally of the wing structure.

Some landing gear designs call for the landing gear to retract outboard of the wing into the engine nacelle. This type of landing gear installation positions the location of the nacelle as the aircraft designer must consider the minimum over-turn angle of the aircraft. A too narrow span between the landing wheels will give the aircraft a critical over-turn angle.

If, to correct for the critical over-turn angle, the nacelle is moved further outboard of the wing, then the designer is faced with the problem of a complicated wing joint. Also, the further the nacelle is moved outward of the wing the more difficult single engine operation of a dual engine aircraft will become.

If the landing gear is retracted into the wing then the wing box beam must be cut. This type of installation would then call for a large structural weight increase to carry the torque.

Another objection to retracting the landing gear into the wing is the fact that it would prevent the carrying of fuel in large portions of the wing.

A weight increase and a lower fuel carrying capacity will result if the landing gear is retracted as above described, thus greatly limiting the range and speed of the aircraft.

If, in order to compensate for the low fuel load, large tip tanks are used, then the designer is faced with a lessened operational speed and range due to the added drag of the tip tanks.

The present invention contains many advantages over other types of retractable landing gear which will now be enumerated.

By retracting the landing gear into the engine nacelle it is not necessary to cut the wing box beam, thus eliminating the necessity of a structural weight increase in order to hold the landing gear.

It is also possible, by the present invention, to use the wing as a fuel carrying container as the present invention does not utilize any of the wing cavity for the landing gear. This use eliminates the need for large tip tanks, thus reducing the drag which, in turn, reduces the amount of fuel to be carried.

By utilizing the present invention a large percentage of an aircraft gross weight can be reduced.

Another advantage of the present invention is that, as the landing gear folds forward into the engine nacelle, it is possible, in cases of emergency, to extend the gear for landing operations by the force of gravity and air load. It would be possible, if the pressure system failed or was damaged in combat, to allow the landing gear to extend into the down lock position by the action of gravity or air load on its frontal area. It is certainly conceivable and practical to assume that violent action or movement of the aircraft would tend to extend the landing gear if such action were required.

In this particular landing gear one pressure cylinder is used to do all the work of retraction and movement. The one cylinder retracts the entire landing gear assembly and simultaneously rotates the bogie unit and wheels into the desired retracted or folded position. By folding the gear as is done herein, a minimum frontal area is achieved which is necessary in order to keep the nacelle as small as possible.

The use of a forward retracting landing gear into an engine nacelle or jet pod allows the movement inboard of the nacelle or pod, thus relieving the crowded wing joint.

It is an object of the present invention, therefore, to use one pressure cylinder to do the entire work of retraction of the landing gear assembly.

It is another object of the present invention to develop a landing gear assembly that presents the very smallest frontal area.

It is a further object of the present invention to develop a landing gear that requires only two points of attachment to the aircraft fuselage.

It is a still further object of the present invention to develop a forward folding landing gear that can utilize the force of gravity and air load in order to assume its extended landing position.

With the above objects in mind and with other objects becoming apparent as the specification is read, the novelty of the present invention will become readily apparent from the drawing accompanying the specification and from the claims which will appear at the end of the said specification.

Figure 2 is a side view of the invention showing the landing gear, by solid lines, in the fully retracted position, and by broken lines in the extended position and an intermediate point of travel position;

Figure 3 is a front view of the invention;

Figure 4 is a view of the locking mechanism as it appears in the down lock position;

Figure 5 is a view of the locking mechanism as it appears during a period of the operating cycle; and Figure 6 is a view of the locking mechanism as it appears in its locked position with the gear retracted.

Figure 1:
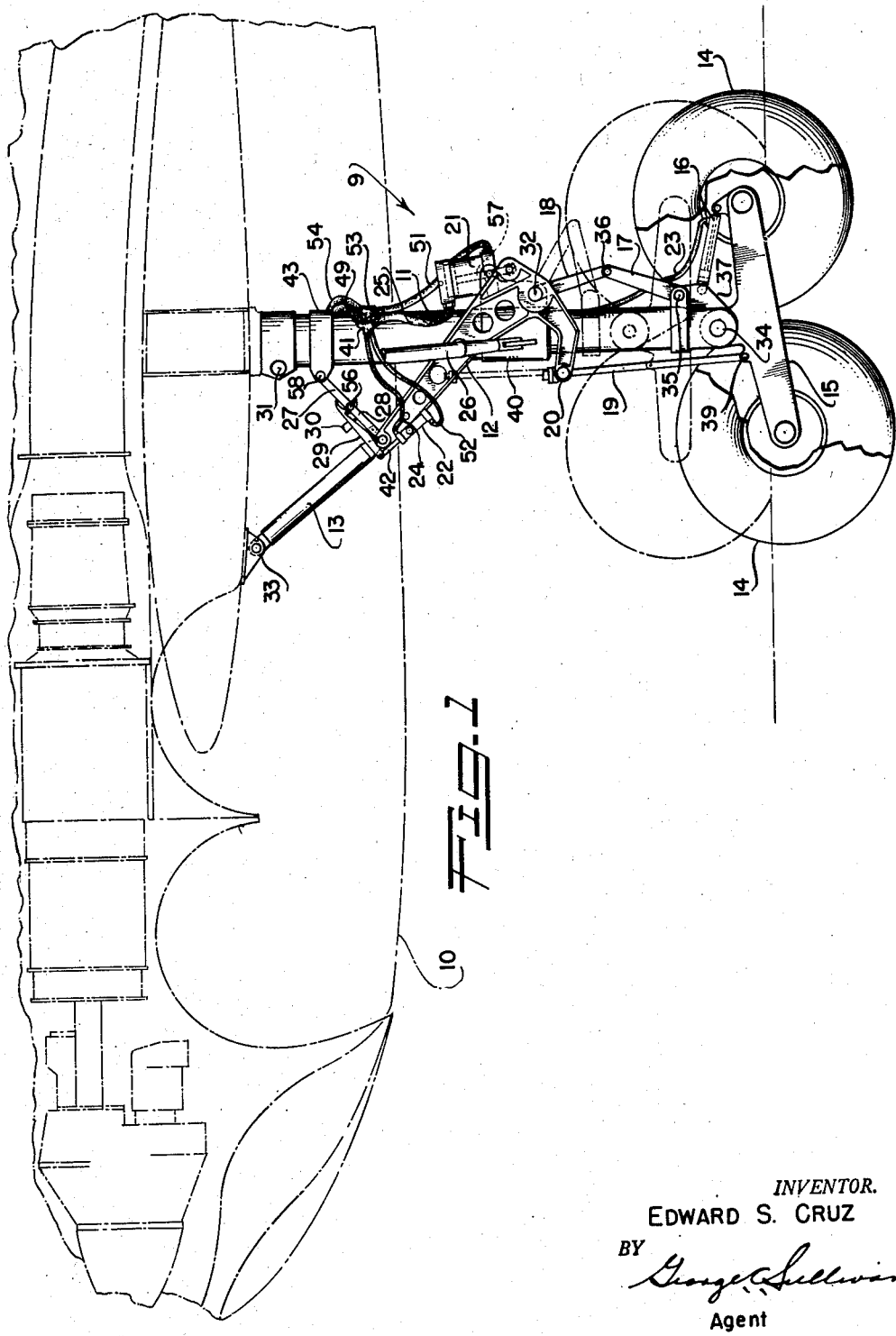
Figure 1 is a side view of the invention showing the landing gear, by solid lines, in the extended position and by broken lines in the static position.

The landing gear 9 is shown, Figure 1, as being extended from an engine nacelle 10.

Each landing gear 9 installation includes a main strut 11, the internal structure of which is not material to this invention but which is used to dampen the loads of landing and taxiing. The main strut 11 is secured to the aircraft structure at 31, which is the main strut pivot point.

The wheels 14 are fastened to a bogie unit 15 which is, in turn, secured to the main strut 11 through a bogie unit pivot point 34. The said bogie unit pivot point 34 is a part of the main strut fitting 37 which is secured to the lower end of the main strut 11.

Also as a part of the main strut fitting 37 is a lower torque link pivot point 35 at which point one end of the lower torque link 17 is secured. The other end of the lower torque link 17 is joined at 36 to an upper torque link 18, said point 36 being the torque link pivot point common to both the upper and lower torque links 17 and 18. The other end of the upper torque link is secured to the lower drag strut 12 at 32 which is the lower drag strut pivot point.

Still referring to Figure 1, there is shown a tension rod 19, one end of which is fastened to the bogie unit 15 at 39 which is the tension rod-bogie connection.

In Figure 3 one end of the tension rod 19 is shown running through the slip joint 20. The slip joint 20 is incorporated as a part of the spacer 45.

A main strut collar 40 is shown in Figure 1 to which is secured the retraction cylinder 21 and the stabilizing strut 26. One end of the stabilizing strut 26 is not shown in this view, Figure 1, but can be more clearly seen in a view to be subsequently described.

Pressure to the pressure cylinder 21 is supplied by two main pressure lines 49 and 54.

A T joint 41 is positioned between the pressure line 49 and the locking cylinder pressure line 24 and the pressure cylinder pressure line 25. The locking cylinder 22 is supplied fluid pressure by the locking cylinder pressure line 24 and the pressure cylinder 21 is supplied fluid pressure by the pressure cylinder pressure line 25.

A T joint 53 is positioned between the pressure line 54 and the locking cylinder pressure line 52 and the pressure cylinder pressure line 51. The locking cylinder 22 is supplied fluid pressure by the locking cylinder pressure line 52 and the pressure cylinder 21 is supplied fluid pressure by the pressure cylinder pressure line 51.

The pressure lines 49 and 54 above mentioned originate in a common type of fluid pressure equipment (not shown).

The latching cylinder 22 is positioned on and secured to the lower drag strut 12.

The piston arm 42 of the latching cylinder 22 is fastened to one end of the latch 29.

The latch 29 is pivoted on the latch mounting arm 28 and the latch 29 is spring loaded to its engaged position wherein hook 48 catches with the flat portion of cam 47 by means of a latch spring 30. One end of the latch mounting arm 28 is secured to and pivots on the lower drag strut 12 while the other end of the latch mounting arm 28 is fastened to the locking arm 27 at the bearing 56. The locking arm 27 is in turn, by means of the pivotal connection 58, secured to a collar mounted on the main strut 11.

Figure 2 of the drawings shows the landing gear 9, by solid lines, in a fully retracted position in the engine nacelle 10. Broken line position A shows the landing gear 9 fully extended under no load conditions while broken line position B shows the landing gear 9 approximately mid-way the retraction cycle.

Figure 3 is a drawing of the front view of the landing gear 9 under no load conditions. The attaching means for the main strut 11 and the stabilizing struts 26 is through the fulcrum 44. A spacer 45 joins the two lower drag struts 12. The spacer 45 also contains the slip joint 20 through which the tension rod 19 is free to move. In broken lines there is shown the position of the wheel well doors 46 in their fully open position. Figure 3 also shows the relative position of the four wheels 14 incorporated in the landing gear 9.

Figure 4 of the drawing is an enlarged view of the locking means used in the landing gear 9 and shows the relative location and locking of the parts under the fully extended position.

As a part of the locking arm 27 there is shown a semicircular enlarged portion or cam 47 on which the hook 48 of the latch 29 moves and locks. The spring loaded means 30 is likewise shown in greater detail in this view.

Figure 5 shows the locking mechanism as it would appear approximately mid-way the retraction cycle or likewise as it would appear mid-way the extension cycle. This view shows the hook 48 of the latch 29 lifted out from engagement with the cam 48 and sliding over the cam portion curved surface. The actions herein depicted will be fully explained in the description of the landing gear 9 operation.

A further view of the locking mechanism is shown in Figure 6 which clearly shows the parts of the locking means as they appear when the landing gear 9 is fully retracted. As is evident from the drawing, the hook 48 of the latch 29 has again re-engaged and locked with the cam 47 of the locking arm 27. In this view the main strut 11 is shown in an approximately horizontal position which corresponds to the position of the main strut 11, as is shown by the solid line portion of Figure 2.

Beginning with the landing gear 9 in the extended position under no load, which is shown in Figure 1 by the solid line portion of the drawings, the unlocking, retraction and relocking operations will now be explained.

The retraction of the landing gear 9 is initiated by introducing into the pressure cylinder 21 a fluid under pressure from a pressure source (not shown) by means of the pressure line 49. At the same time, fluid pressure is supplied to the locking cylinder 22 by means of the pressure line 24. The locking cylinder 22 operates first due to the lower pressure required and by the action of the piston arm 42 which causes the latch 29 to pivot counterclockwise about the latch pivot point 50. This movement of the latch 29 disengages the hook 48 of the latch 29 from the flat portion of the cam 47. The action of the locking cylinder 22 overrides the force of the latch spring 30 which holds the latch 29 in its locking position.

This unlocking action above described allows the lower drag strut 12 to rotate about the lower drag strut pivot point 32. As the lower drag strut 12 rotates it causes the landing gear 9 to retract into the nacelle 10. The landing gear rotates about the main strut pivot point 31.

As the retraction movement continues a restraining force is applied to the drag strut 12 by means of the upper drag strut 13 since this latter strut is secured at point 33 to the airplane for resisting or restraining the movement of drag strut 12. The upper drag strut 13 is secured to the drag strut 12 through the pivot point 55 so that drag strut 12 will rotate clockwise about pivot point 55.

The retraction movement of the landing gear 9 and the restraining force of the upper drag strut 13 above described will cause the locking arm 27 and the latch mounting arm 28 to move through a scissor action through the pivot point 56.

The scissoring action takes place when the drag strut 12 rotates clockwise about pivot point 55 with respect to strut 13 and through the bearing 56, Figure 5, which causes the locking arm 27 and the latch mounting arm 28 to move in a generally forward and upward direction. As the retraction movement continues the restraint applied by the upper drag strut 13 causes the locking arm 27 and the latch mounting arm 28 to ultimately reassume their original locked position. The final locked position, however, is not obtained until the landing gear 9 is fully retracted into the nacelle 10.

As the lower drag strut 12 rotates it also pulls on the tension rod 19 which is attached to the bogie unit 15 on one end and to the slip joint 20 on the drag strut spacer 45 on the other end. This pull applied to the tension rod 19 causes the bogie unit 15 to rotate about the bogie unit pivot point 34. The positioning of the bogie unit 15 is shown by the broken line portions of Figure 2, particularly at position B.

As the retraction cycle of the landing gear 9 continues, the bogie unit 15 and wheels 14 assume the position as shown by the solid lines of Figure 2.

Considering Figure 4 of the drawings, the locking mechanism is shown locked and as it appears when the landing gear 9 is in the extended or down position. As fluid pressure is applied to the locking cylinder 22 by means of the locking cylinder pressure line 24, as heretofore described, the piston rod 42 is moved, which pulls down on the latch 29 which, in turn, raises the hook 48 free of the cam 47. A movement results which allows the hook 48 to move on the curved portion of the cam 47, as can be seen by referring to Figure 5 of the drawings. This view, Figure 5, of the locking means corresponds to the position of the landing gear 9 as shown in the broken line portion of Figure 2 at position B. At this point of the retraction cycle the locking arm 27 has reached the maximum limits of its travel which has been in an upward direction from its original static position and is now momentarily in a fixed position prior to assuming the up-locked position as shown in Figure 6.

The movement of the lower drag strut 12, as above described, continues under fluid pressure causing the landing gear to continue to move upward and forward. The hook 48 on the latch 29 continues to move along the cam 47 until the hook 48 again becomes engaged with the flat portion of the cam 47. When the fluid pressure is released from the retraction cylinder 21 the gear is restrained in the retracted position by the locking mechanism.

The movement of the bogie unit 15 and wheels 14 is dampened by the action of the bogie unit positioning cylinder 16 which is maintained under a constant fluid pressure at all times but is overridden by the tension rod 19 during the retraction cycle.

In the retraction operation of the landing gear 9 heretofore described, the fluid pressures applied to the pressure cylinder 21 and the locking cylinder 22 cause the pistons 42 and 57, incorporated as parts of the two cylinders 21 and 22, to act on the lower drag strut 12 and the latch 29.

In order to return the landing gear 9 to its original extended position the two pistons 42 and 57 must be made to return to their original positions.

The landing gear 9 is moved from the retracted position to the extended position by applying fluid pressure to the pressure cylinder 21 by means of a pressure line 54. At the same time fluid pressure is supplied to the locking cylinder 22 by means of the pressure line 52.

The locking cylinder 22 again operates first due to the lower pressure required and, by the action of the piston arm 42, again causes the latch 29 to pivot counterclockwise about the latch pivot point 50. The movement of the latch 29 disengages the hook 48 of the latch 29 from the flat portion of the cam 47. Again the latch spring 30 is overridden by the action of the locking cylinder 22 and the latch 29 is released.

The unlocking action above described allows the lower drag strut 12 to move about the lower drag strut pivot point 32. As the lower drag strut 12 rotates it causes the landing gear 9 to move from the retracted position in the nacelle 10 into the extended position.

The movement of the landing gear 9 from the retracted position to the extended position causes the locking mechanism as shown in Figures 4, 5 and 6, to again repeat the scissoring movements as heretofore described.

The bogie positioning cylinder 16, which is maintained under constant pressure, applies a positioning urgement to the bogie unit 15. The bogie unit 15 in turn applies a pulling action to the tension rod 19 causing the said tension rod 19 to react to the movement of the lower drag strut 12 while the landing gear 9 is being extended.

The bogie positioning cylinder 16 also keeps the wheels 14 from possibly assuming a vertical position on landing due to a bounce action of the bogie unit 15 on making contact with the ground on landing.

Torque action of the landing gear is prevented by the torque links 17 and 18.

While the invention has been described in detail in its present preferred embodiment, it will be quite obvious to those skilled in the art that various changes and modifications may be made without departing from the intent of the invention.

I claim:

1. In an aircraft retractable landing gear including a shock absorbing strut and a wheel bogie pivoted in the end thereof for folding during the retraction of the strut, a drag strut pivotally mounted to the said shock absorbing strut, a fluid pressure means inluding a cylinder and piston for retraction of the said landing gear said cylinder mounted to the said shock absorbing strut and the piston secured to the said drag strut, locking means for said landing gear connected between the shock strut and the drag strut with a fluid pressure cylinder including a piston for unlocking the said locking means, said cylinder mounted to the said drag strut and the piston secured to the said locking means, said cylinder of the unlocking means being smaller than the cylinder of the retraction means, parallel fluid connections to the retraction and locking cylinders, a rod member slidably mounted to the said drag strut and pivotally secured to the said wheel bogie member, a cylinder mounted to the said shock absorbing strut, said cylinder including a piston under constant fluid pressure with the piston secured to the wheel bogie member, for dampening movement of the wheel bogie member, a retraction cylinder secured to the shock strut including a piston pivotally connected to the drag strut, and the last mentioned cylinder and piston providing an urging force to the said rod member as the said drag strut is retracted whereby to fold the wheel bogie member during the retraction of said strut.

2. In an aircraft retractable landing gear including a shock absorbing strut maintained in a generally vertical position when extended for landing with means for pivotally mounting the upper end of the said shock strut, a wheel mounting bogie member at the opposite end of the pivotally mounted shock strut, means for pivoting the bogie member forwardly of the shock strut during the retraction movement of the strut, a drag strut means pivotally mounted to the said shock strut, a retracting cylinder mounted on the said shock strut and operationally connected to the said drag strut to pivot the drag strut with respect to the shock strut, a rod member slidably carried by the drag strut and pivotally connected to the bogie member to pivot the bogie member in response to operation of the retracting cylinder, a single locking means extended between the said drag strut and the said shock strut to maintain the landing gear in both the extended and retracted position, a lock releasing cylinder mounted on the said drag strut and operationally connected to the locking means, the cylinder of the locking means being smaller than the cylinder of the retracting means and a common fluid pressure system supplying fluid pressure to the said cylinders whereby the lock is released simultaneously with application of fluid pressure to the retracting cylinder.

References Cited in the file of this patent

UNITED STATES PATENTS

| | | |
|---|---|---|
| 2,220,546 | Saulnier | Nov. 5, 1940 |
| 2,280,185 | Bridges | Apr. 21, 1942 |
| 2,294,467 | Lemonier | Sept. 1, 1942 |
| 2,355,764 | Waseige | Aug. 15, 1944 |
| 2,484,919 | Westcott | Oct. 18, 1949 |
| 2,490,485 | Spaeth | Dec. 6, 1949 |
| 2,504,458 | Schmidt et al. | Apr. 18, 1950 |
| 2,559,451 | McBrearty | July 3, 1951 |
| 2,630,990 | Kanode et al. | Mar. 10, 1953 |

FOREIGN PATENTS

| | | |
|---|---|---|
| 464,144 | Great Britain | Apr. 13, 1937 |
| 486,211 | Great Britain | June 1, 1938 |
| 650,547 | Great Britain | Feb. 28, 1951 |
| 651,149 | Great Britain | Mar. 14, 1951 |
| 663,245 | Great Britain | Dec. 19, 1951 |